United States Patent
Mizuno

(10) Patent No.: US 9,538,039 B2
(45) Date of Patent: Jan. 3, 2017

(54) DATA OUTPUT DEVICE

(71) Applicant: BROTHER KOGYO KABUSHIKI KAISHA, Nagoya, Aichi (JP)

(72) Inventor: Nobuhiro Mizuno, Aichi (JP)

(73) Assignee: BROTHER KOGYO KABUSHIKI KAISHA, Nagoya, Aichi (JP)

( * ) Notice: Subject to any disclaimer, the term of this patent is extended or adjusted under 35 U.S.C. 154(b) by 29 days.

(21) Appl. No.: 14/582,473

(22) Filed: Dec. 24, 2014

(65) Prior Publication Data

US 2015/0189119 A1 Jul. 2, 2015

(30) Foreign Application Priority Data

Dec. 27, 2013 (JP) .................................. 2013-273092

(51) Int. Cl.
*G06K 15/00* (2006.01)
*H04N 1/32* (2006.01)
*H04N 1/21* (2006.01)
*G06F 3/12* (2006.01)

(52) U.S. Cl.
CPC ........ *H04N 1/32122* (2013.01); *H04N 1/2158* (2013.01)

(58) Field of Classification Search
None
See application file for complete search history.

(56) References Cited

U.S. PATENT DOCUMENTS

| | | | | |
|---|---|---|---|---|
| 2003/0234952 A1* | 12/2003 | Abe | ...................... | G06F 3/1205 358/1.14 |
| 2004/0141650 A1* | 7/2004 | Hansson | ................... | G06T 1/60 382/232 |
| 2007/0258109 A1* | 11/2007 | Sasaki | ..................... | G06K 15/00 358/1.16 |
| 2011/0228315 A1* | 9/2011 | Arai | ................... | H04N 1/00204 358/1.15 |

FOREIGN PATENT DOCUMENTS

| | | |
|---|---|---|
| JP | 2004-280417 A | 10/2004 |
| JP | 2006-110941 A | 4/2006 |
| JP | 2007-136934 A | 6/2007 |
| JP | 2012-101451 A | 5/2012 |

* cited by examiner

*Primary Examiner* — Dov Popovici
(74) *Attorney, Agent, or Firm* — Scully, Scott, Murphy & Presser, P.C.

(57) ABSTRACT

When an internal storage device or an output device does not have a sufficient free space, predetermined part of the unstored subject data in an external storage device is stored into the internal storage device; the subject data having been stored in the internal storage device is output then the area where the subject data is stored in the internal storage device is released. When the internal storage device has a free space in which all the unstored subject data can be stored, all the unstored subject data is stored into the internal storage device; a communication condition between the communication unit and the external storage device is detected; and the subject data is output except for at least part of the subject data to be output lastly. The subject data is output only when the communication condition has been changed to the non-communicatable condition.

12 Claims, 7 Drawing Sheets

DATA OUTPUT DEVICE

CROSS-REFERENCE TO RELATED APPLICATION

This application claims priority under 35 U.S.C. §119 from Japanese Patent Application No. 2013-273092 filed on Dec. 27, 2013. The entire subject matter of the application is incorporated herein by reference.

BACKGROUND

1. Technical Field

The present disclosures relate to data output device configured to retrieve data from an external storage medium and output the retrieved data.

2. Related Art

Conventionally, there has been known an image forming apparatus configured to print out data subject to print (hereinafter, also referred to as subject data) and stored in an external storage device when the external storage device is coupled to the image forming apparatus. Typically, such a conventional image forming apparatus is configured to obtain subject data from the external storage device, store the same in an internal storage device, and prints out the thus stored subject data. In order for a user not to remove the external storage from the image forming device, in such a conventional image forming apparatus, removal of the external storage device is detected, and printing of the subject data is allowed only after the external storage device is removed.

SUMMARY

In such a conventional image forming apparatus, printing of the subject data is not allowed unless the external storage device is removed from the image forming apparatus. Because of this configuration, if the internal storage device does not have sufficient free space for storing the subject data obtained from the external storage device, printing cannot be executed.

In consideration of the above, following disclosures provide a data output device configured to output data subject to output (i.e., subject data) stored in the external storage device coupled to the data output device, and prevent the user from leaving the external storage device. Further, the present disclosures provide the data output device capable of outputting the subject data even if there is not sufficient free space for storing all the subject data stored in the external storage device.

According to aspects of the disclosures, there is provided a data output device which is provided with a communication unit configured to communicate with an external storage device storing subject data which is data subject to output, an outputting unit, an internal storage device, and a control unit. The control unit is configured to cause, when executing instructions, the data output device to execute a determining process to determine whether the internal storage device has a free space in which all unstored subject data, which is the subject data stored in the external storage device and has not been stored in the internal storage device, can be stored. When the control unit determines that the internal storage device does not have the free space in which all the unstored subject data can be stored, the control unit causes the data output device to repeatedly execute following processes: (a) a first storing process to store predetermined part of the unstored subject data into the internal storage device; (b) a first output process to output, with use of the outputting unit, the subject data having been stored in the internal storage device, an area of the internal storage device occupied by the subject data output by the first output process being released when the subject data is output; and (c) the determining process to determine whether the internal storage device has the free space in which all the unstored subject data can be stored. Further, when the control unit determines that the internal storage device has a free space in which all the unstored subject data can be stored, the control unit causes the data output device to execute following processes: (d) a second storing process to store all the unstored subject data into the internal storage device; (e) a condition determining process to detects a communication condition between the communication unit and the external storage device; and (f) a second output process to output, with use of the outputting unit, all the subject data having been stored in the internal storage device, the subject data to be output lastly being output only when the control unit detects that the communication condition between the communication unit and the external storage device has been changed to the non-communicatable condition.

According to further aspects of the disclosures, there is provided a data output device which is provided with a communication unit configured to communicate with an external storage device storing subject data which is data subject to output, an outputting unit, an internal storage device, and a control unit. The control unit is configured to cause, when executing instructions, the data output device to execute a determining process to determine whether the internal storage device has a free space in which all unstored subject data, which is the subject data stored in the external storage device and has not been stored in the internal storage device, can be stored. Until the control unit determines that the internal storage device has the free space in which all the unstored subject data can be stored, the control unit causes the data output device to repeatedly execute following processes: (a) a storing process to store predetermined part of the unstored subject data into the internal storage device; (b) an output process to output, with use of the outputting unit, the subject data having been stored in the internal storage device, an area of the internal storage device occupied by the subject data output by the first output process being released when the subject data is output; and (c) the determining process to determine whether the internal storage device has a free space in which all the unstored subject data can be stored.

According to furthermore aspects of the disclosures, there is provided a data output device which is provided with a communication unit configured to communicate with an external storage device storing subject data which is data subject to output, an outputting unit, an internal storage device, and a control unit. The control unit is configured to cause, when executing instructions, the data output device to execute a determining process to determine whether the internal storage device has a free space in which all unstored subject data, which is the subject data stored in the external storage device and has not been stored in the internal storage device, can be stored. When the control unit determines that the internal storage device has the free space in which all the unstored subject data can be stored, the control unit causes the data output device to execute following processes: a storing process to store all the unstored subject data into the internal storage device; a condition determining process to detect a communication condition between the communication unit and the external storage device; and an output process to output, with use of the outputting unit, all the subject data having been stored in the internal storage device, at least part of the subject data to be output lastly being output only when the control unit detects that the communication condition between the communication unit and the external storage device has been changed to the non-communicatable condition.

BRIEF DESCRIPTION OF THE
ACCOMPANYING DRAWINGS

DETAILED DESCRIPTION OF THE
ILLUSTRATIVE EMBODIMENTS

It is noted that various connections are set forth between elements in the following description. It is noted that these connections in general and, unless specified otherwise, may be direct or indirect and that this specification is not intended to be limiting in this respect. Aspects of the present disclosure may be implemented on circuits (such as application specific integrated circuits) or in computer software as programs storable on computer-readable media including but not limited to RAMs, ROMs, flash memories, EEPROMs, CD-media, DVD-media, temporary storages, hard disk drives, floppy drives, permanent storages, and the like.

First Illustrative Embodiment

Figure 2:
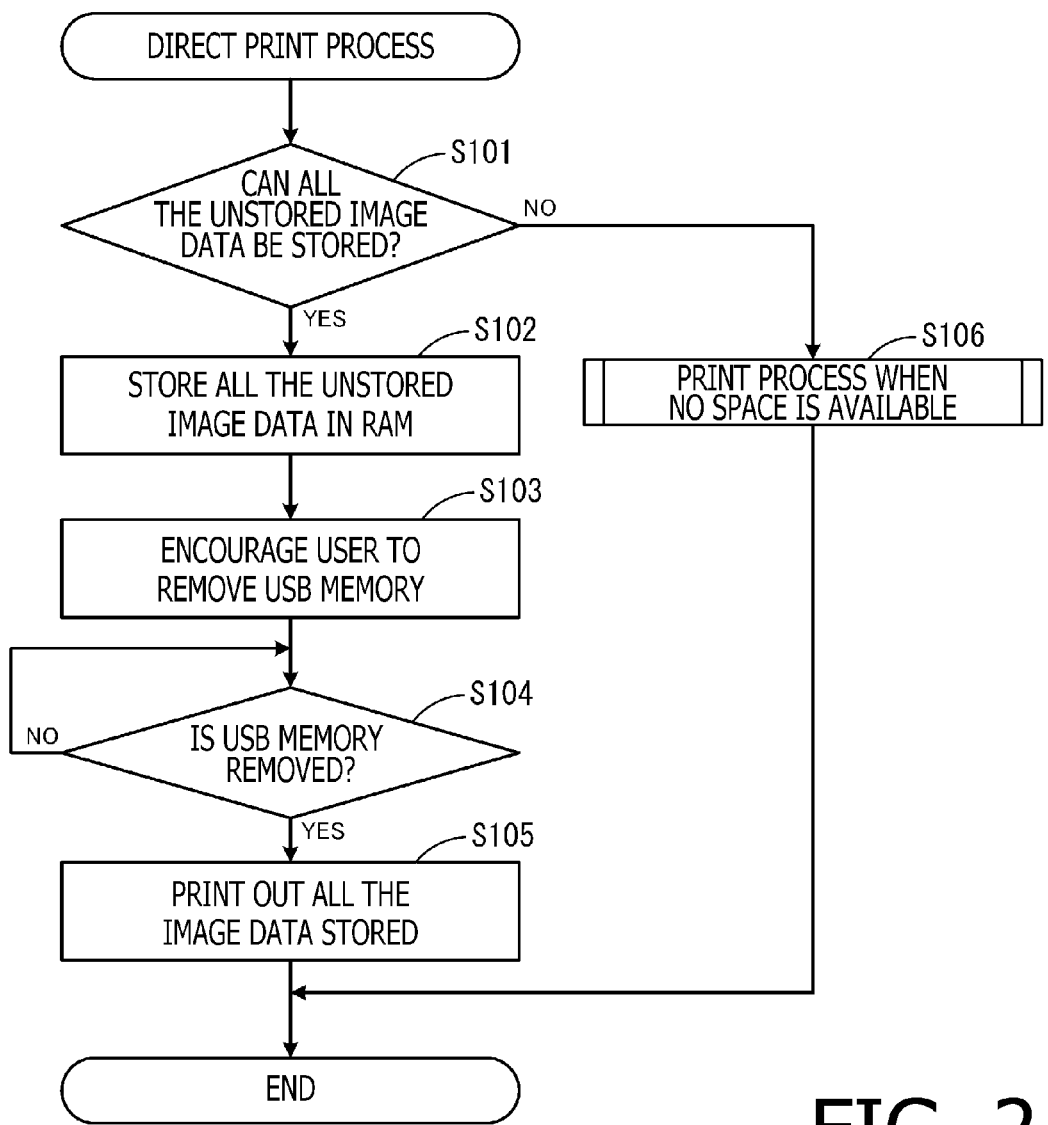
FIG. 2 is a flowchart illustrating a direct print process according to the first illustrative embodiment.
Figure 3:
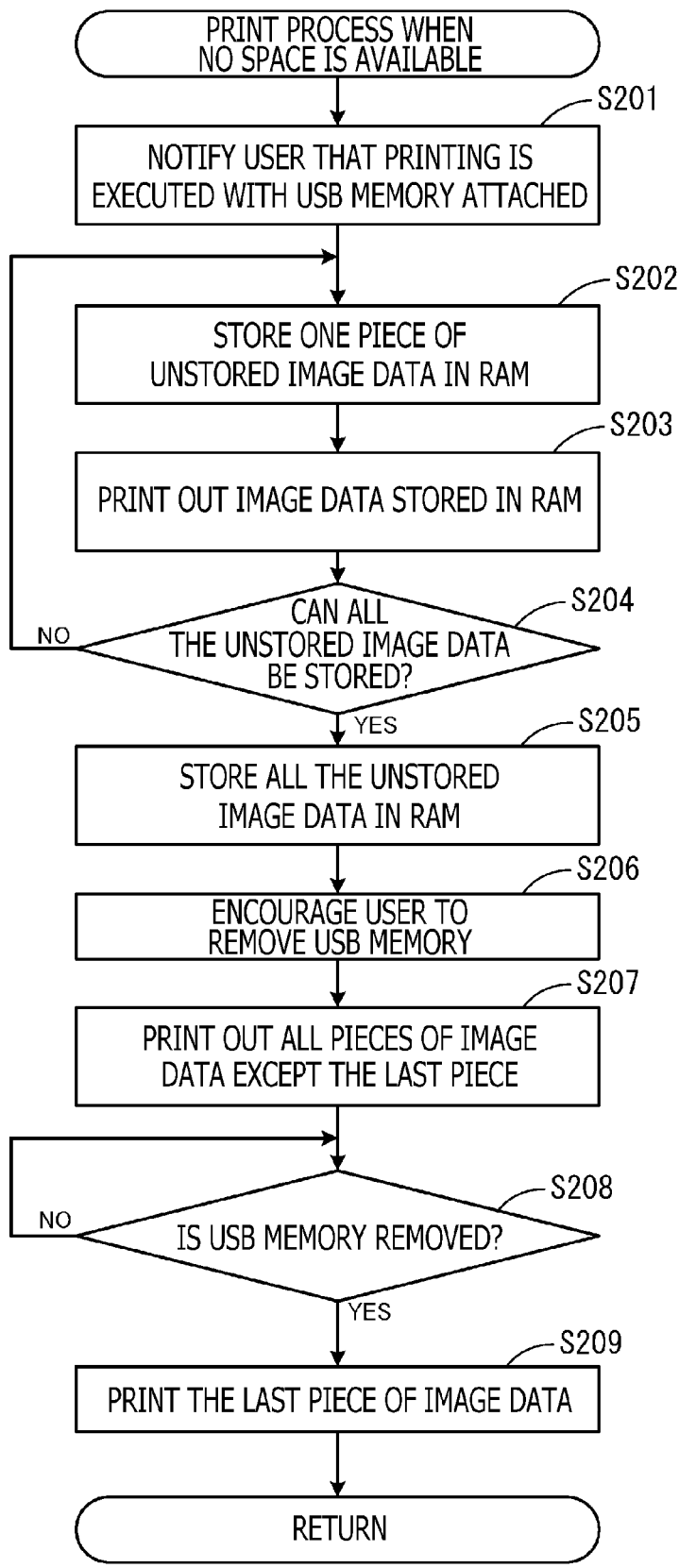
FIG. 3 is a flowchart illustrating a print process when there is not sufficient space in the storage device according to the first illustrative embodiment.

Firstly, referring to FIGS. 1-3, a printer 1 according to a first illustrative embodiment will be described.

Electric Configuration of Printer

Figure 1:
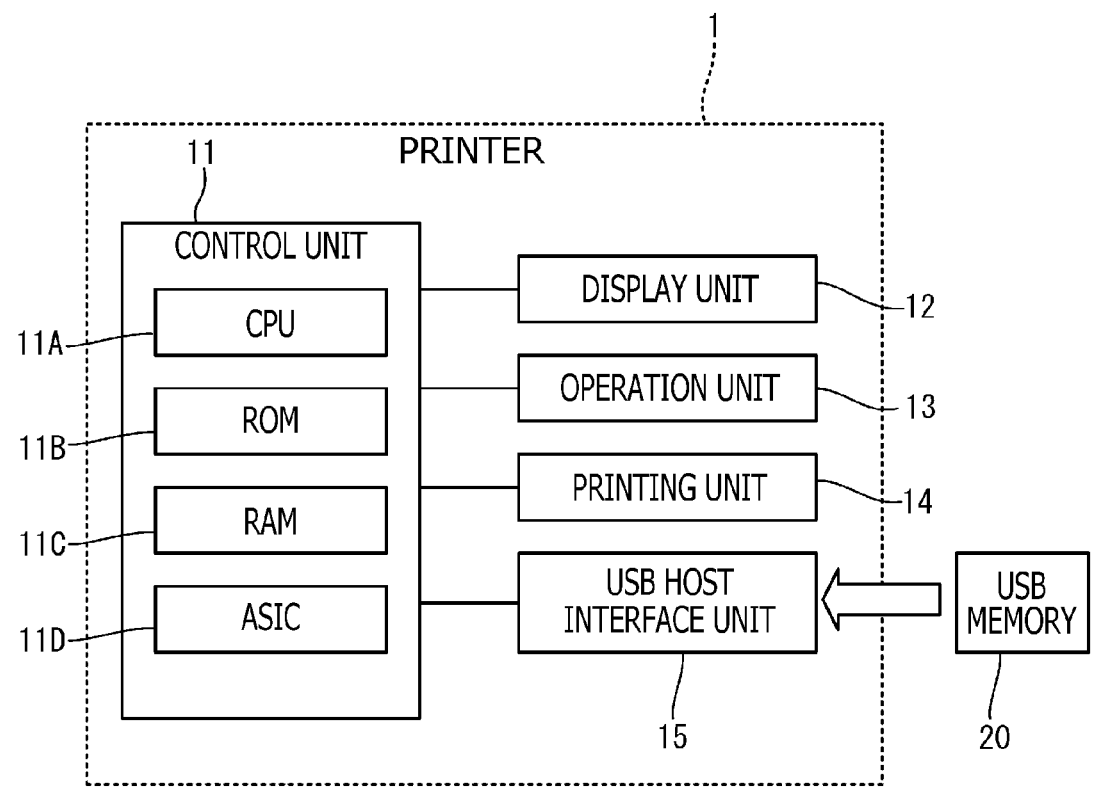
FIG. 1 is a block diagram showing an electrical configuration of a data output device according to a first illustrative embodiment.

As shown in FIG. 1, the printer 1, which is an example of a data output device according to a first illustrative embodiment, has a control unit 11, a display unit 12, an operation unit 13, a printing unit 14, and a USB (universal serial bus) host interface unit 15.

The control unit 11 mainly includes a CPU (central processing unit) 11A, a ROM (read only memory) 11B, a RAM (random access memory) 11C, an ASIC (application specific integrated circuit) 11D. The CPU 11A executes control programs stored in the ROM 11B and control components of the printer 1. The ROM 11B stores, in addition to the control program, various pieces of data and the like. The RAM 11C is used as a main storage device when the CPU 11A executes various programs.

The display unit 12 includes a displaying device such as an LCD (liquid crystal display) and a driving circuit configured to drive the displaying device. The operation unit 13 is provided with a touch panel which is arranged to cover the display unit 12. As well known, when a user touch operation buttons and the like displayed on the display unit 12 through the touch panel (which is typically transparent), the user operation is input through the touch panel (i.e., acquired by the touch panel). Optionally or alternatively, the operation unit 13 may have mechanically operable buttons through which the user operation can also be input.

The printing unit 14 is configured to print images represented by image data on a printing sheet or the like in accordance with an electrophotographic imaging method or an inkjet printing method. In the following description, printing an image represented by image data will be simply expressed such that image data is printed.

The USB host interface unit 15 has a USB host controller and a USB slot to which the USB memory 20, USB mass-storage device such as a USB hard disk and the like can be inserted. In this specification, the term USB memory 20 includes the USB mass-storage device. When the USB memory 20 is inserted to the USB slot, the USB host interface 15 becomes communicatable with the USB memory 20, while when the USB memory 20 is removed from the USB slot, the printer 1 is unable to communicate with the removed USB 20.

It is noted that the printer 1 may have a memory card reader, which may have card slots in accordance with various memory card standards, instead of or in addition to the USB host interface unit 15.

Direct Print

The printer 1 is configured to execute a direct print. The direct print is a method in which the user directly operates the printer 1 to print without using external devices such as a personal computer.

When the direct print is performed, the user firstly attaches the USB memory 20 storing the image data to the USB host interface 15, and operates the operation unit 13 to select a direct print process as a process to be executed. When the user select the direct print process, the CPU 11A displays a list of images (thumbnails) of the image data stored in the USB memory 20 on the display unit 12 and acquires the user input to select subject image data (i.e., image data subject to print).

After selected the subject image data, the user depresses a print start button which is displayed on the display unit 12 to instruct to print. When the user depresses the print start button, the CPU 11A retrieves subject image data from the USB memory 20, and stores the same in the RAM 11C. Then, the CPU 11A causes the printing unit 14 to print the subject image data which is stored in the RAM 11C.

When the direct print process is performed, the user may forget to remove the USB memory 20 from the printer 1 after printing is executed. In such a case, the USB memory 20 is remained attached to the printer 1. According to the illustrative embodiment, to avoid such a situation, the CPU 11A allows printing of the image data subject to print and stored in the RAM 11C after the USB memory 20 is removed from the printer 1.

It is noted that, there may be a case where the RAM 11C may not have sufficient free space and all the subject image data may not be stored in the RAM 11C. In such a case, if the USB memory 20 is removed, part of the subject image data which has not been stored in the RAM 11C will not be printed.

Therefore, according to the illustrative embodiment, when the user depresses the print start button, the CPU 11A determines whether the RAM 11C has a sufficient free space in which the part of the image data subject to print but has not been stored in the RAM 11C. If the RAM 11C has a sufficient free space for storing the unstored image data, the CPU 11A stores all the unstored image data (i.e., the image data which has not been stored in the RAM 11C) into the RAM 11C, and thereafter, on condition that the USB memory 20 is removed from the printer 1, the CPU 11A causes the printer 1 to print the image data stored in the RAM 11C. If the RAM 11C does not have a sufficient free space to store all the unstored image data, the CPU 11A allows printing of the image data stored in the RAM 11C even if the USB memory 20 is not removed from the printer 1.

Direct Print Process

Hereinafter, the direct print process executed by the CPU 11A will be described, referring to the flowchart shown in FIG. 2.

The direct print process is started when the user attaches the USB memory 20 to the USB host interface unit 15, and depresses the print start button. In the following description regarding the direct print process, the term "unstored image data" means subject image data which is stored in the USB memory 20 but has not been stored in the RAM 11C.

In S101, the CPU 11A determines whether there is a sufficient free space in the RAM 11C for storing all the unstored image data. It is noted that all the subject image data is the unstored image data immediately after the print start button is depressed.

Specifically, in S101, the CPU 11A determines whether the sum of the size of the unstored image data is less than the size of the free space of the RAM 11C. When the sum of the unstored image data is less than the size of the free space of the RAM 11C, the CPU 11A determines that the RAM 11C has free space. When the sum of the size of the unstored image data is equal to or greater than the size of the free space of the RAM 11C, the CPU 11A determines that the RAM 11C does not have a free space. When the CPU 11A determines that the free space is available (S101: YES), the CPU 11A proceeds to S102, otherwise (S101: NO), the CPU 11A proceeds to S106.

In S103, the CPU 11A causes the display unit 12 to display a message (e.g., "remove the USB memory") to encourage the user to remove the USB memory 20 from the printer 1.

In S104, the CPU 11A determines whether the USB memory 20 has been removed from the printer 1. When the USB memory has been removed (S104: YES), the CPU 11A proceeds to S105. When the USB memory 20 has not been removed from the printer (S104: NO), the CPU 11A repeats S104 until the USB memory 20 is removed from the printer 1. In other words, the CPU 11A holds a standby state and does not execute printing until the USB memory 20 is removed from the printer 1.

In S105, the CPU 11A causes the printing unit 14 to print all the image data stored in the RAM 11C in S102. In S106, the CPU 11A executes the print process when the CPU 11A does not have a sufficient free space. This process will be described in detail later.

Print Process when No Free Space is Available

In S201, the CPU 11A causes the displaying unit 12 to display a message (e.g., "printing will be executed with the USB memory being attached to the printer") to notify the user that the RAM 11C does not have the sufficient free space.

In S202, the CPU 11A retrieves a piece of the unstored image data from the USB memory 20 and stores the same in the RAM 11C. It is noted that the following description refers to a case where a one pieces of image data is retrieved from the USB memory 20 and stored in the RAM 11C. However, it is only an example, and the configuration may be modified such that a plurality of pieces of unstored image data may be retrieved from the USB memory 20 and stored in the RAM 11C when the RAM 11C does not have a free space for storing all the unstored data but has a sufficient free space for storing the plurality of pieces of the unstored image data.

In S203, the CPU 11A cause the printing unit 14 to print out the image data that is stored in the RAM 11C in S202. After the image data is printed by the printing unit 14, the CPU 11A deletes the image data from the RAM 11C or allows the area of the RAM 11C where the image data is stored to be overwritten. With this configuration, the free space of the RAM 11C is increased by the amount where the printed image data is stored.

In S204, the CPU 11A determines whether the RAM 11C has a sufficient free space for storing all the unstored image data. When the CPU 11A determines that the RAM 11C has a sufficient free space for storing all the unstored image data (S204: YES), the CPU 11A proceeds to S205, otherwise (S204: NO) the CPU 11A returns to S202.

In S205, the CPU 11A retrieves all the unstored image data from the USB memory 20 and stores the same in the RAM 11C. In S206, the CPU 11A displays a message encouraging the user to remove the USB memory 20 (e.g., "please remove the USB memory 20 from the printer").

In S207, the CPU 11A causes the printing unit 14 to print out all the image data stored in the RAM 11C in S205 except for the last piece of the image data which is to be printed out lastly.

In S208, the CPU 11A determines whether the USB memory 20 has been removed from the USB host interface unit 15. When the USB memory 20 has been removed (S208: YES), the CPU 11A proceeds to S209. When the USB memory 20 has not yet been removed (S208: NO), the CPU 11A repeats S208 until the USB memory 20 is removed. Thus, until the USB memory 20 is removed, the printing operation is interrupted. That is, when S208 is repeatedly executed as decision at S208 is NO, the process does not proceed to S209. When the USB memory 20 is removed, decision at S208 is YES, and the process proceeds to S209 to restart printing.

According to the printer 1 described above, when it is determined that the RAM 11C has a free space for storing all the unstored data (S101: YES, or S204: YES), the CPU 11A prints out all the image data stored in the RAM 11C (S 105 or S209) on condition that the all the unstored data has been stored in the RAM 11C (S102 or S205) and the USB memory 20 has been removed from the USB host interface unit 15 (S104: YES or S208: YES). Accordingly, it is prevented to remain and the USB memory 20 is removed from the printer 1.

Further, according to the printer 1 described above, when it is determined that the RAN 11C does not have a sufficient free space to store all the unstored image data (S101: NO or S204: NO), part of the image data subject to print is printed and having been stored in the RAM 11C is printed (S202-S204). Accordingly, all the data stored in the RAM 11C can be printed.

As described above, according to the printer 1, it is possible to prevent the USB memory 20 from being remained attached to the printer 1, and to print out all the image data subject to print.

Further, according to the printer 1, when it is determined that the RAM 11C does not have a sufficient free space for storing all the unstored image data (S101: NO or S204: NO), image data stored in the RAM 11C in S202 is printed, in comparison with a case where the image data stored in the RAM 11C and subject to print is printed in accordance with a method other than S201, the image data stored in the USB memory 20 can be printed out earlier. It is noted that an example of image data subject to print and stored in the RAM 11C in accordance with a method other than S201 is image data transmitted from an external device such as a personal computer for printing, or when the printer 1 has a copier function, image data which is generated by scanning an original and stored in the RAM 11C so as to be printed.

According to the printer 1, the user can release his/her hands from the USB memory 20 by inserting the USB memory 20 into the jack of the USB host interface unit 15. However, by this configuration, it may be occur that the USB memory 20 is remain attached to the printer 1 as the user release his/her hands from the USB memory 20. According to the configuration described above, all the data stored in the RAM 11C and is to be output is output (S105 or S209) on condition that the USB memory 20 is removed from the jack of the USB host interface 15 (S104: YES, S208: YES). Thus, according to the configuration described above, it is prevented that the USB memory 20 is remained without being removed from the printer 1.

Further, according to the printer 1 described above, since the USB memory 20 is detachably coupled to the jack of the USB host interface unit 15, and the CPU 11A detects that the printer 1 can communicate with the USB memory 20 when the USB memory 20 is coupled to the jack of the USB host interface unit 15, while the CPU 11A detects that the printer 1 cannot communicate with the USB memory 20. Therefore, all the image data subject to print and stored in the USB memory 20, and it is prevented that the USB memory 20 is remained coupled to the printer 1.

Further, according to the printer 1, the image represented by the image data is output by the printing unit 14, it is possible to prevent the USB memory 20 remained coupled to the printer 1, while images represented by all the image data stored in the USB memory 20 can be printed.

Further, according to the printer 1, after all the image data except for the last piece of the image data stored in the RAM 11C in S205 is printed by the printing unit 14 (S207), if the USB memory 20 has not been removed from the USB host interface unit 15 (S208: NO), the printing operation is interrupted. In other words, if the USB memory 20 has been removed from the USB host interface unit 15 (S208: YES), the printing operation is not interrupted. Therefore, by removing the USB memory 20 after all the unstored image data is stored in the RAM 11C (S205) and before S208, the printing operation is executed smoothly without being interrupted. Therefore, the image data can be printed efficiently.

Further, according to the printer 1, if it is determined that the RAM 11C has a sufficient free space for storing all the unstored image data (S101: YES, or S204: YES), the CPU 11A encourages the user to remove the USB memory 20 (S103, or S206), it is prevented that the USB memory 20 remains unremoved form the printer 1 in comparison with a case where such an encouragement is not made.

Still further, according to the printer 1, if it is determined that the RAM 11C does not have a sufficient free space for storing all the unstored image data (S101: NO), the CPU 11C notifies the user (S201) that the image data will be printed with the USB memory 20 being coupled to the printer 1 before printing of the image data is started in S203. There may be a user who thinks that printing is not started until the USB memory 20 is removed. Such a user may be confused if printing is started while the USB memory 20 is still in a state to communicate with the printer 1. According to the printer 1, since the user is notified that printing is started before the USB memory 20 is removed, such a confusion of the user can be suppressed.

Second Illustrative Embodiment

Next, the configuration of the printer 1 according to a second illustrative embodiment will be described with reference to FIGS. 4 and 5.

According to the first illustrative embodiment, when it is determined that the RAM 11C does not have a sufficient free space for storing all the unstored image data, the unstored image data is retrieved piece by piece and printed, until it is determined that the remaining unstored image data can be stored in the free space of the RAM 11C. It is the same in the second illustrative embodiment. However, according to the second illustrative embodiment, when the RAM 11C does not have a sufficient free space for storing all the unstored image data, printing is interrupted every time when a predetermined number, which is determined by the user, of pieces of image data are printed, and the printing is restarted when the user depresses the print start button. In the following description, the predetermined number set by the user will be referred to a set number.

It is noted that, according to the first illustrative embodiment, when it is determined that the RAM 11C does not have a sufficient free space for storing all the unstored image data (S101: NO), and when it is determined that the RAM 11C has a free space for storing all the unstored image data (S204: YES), all the image data except for the last piece of the image data which is to be printed our lastly is printed out with the USB memory 20 being coupled to the printer 1. In the following description regarding the second illustrative embodiment, a case where the printing is not started until the USB memory 20 is removed when the RAM 11C has a sufficient free space for storing the unstored image data.

Direct Print Process

Figure 4:
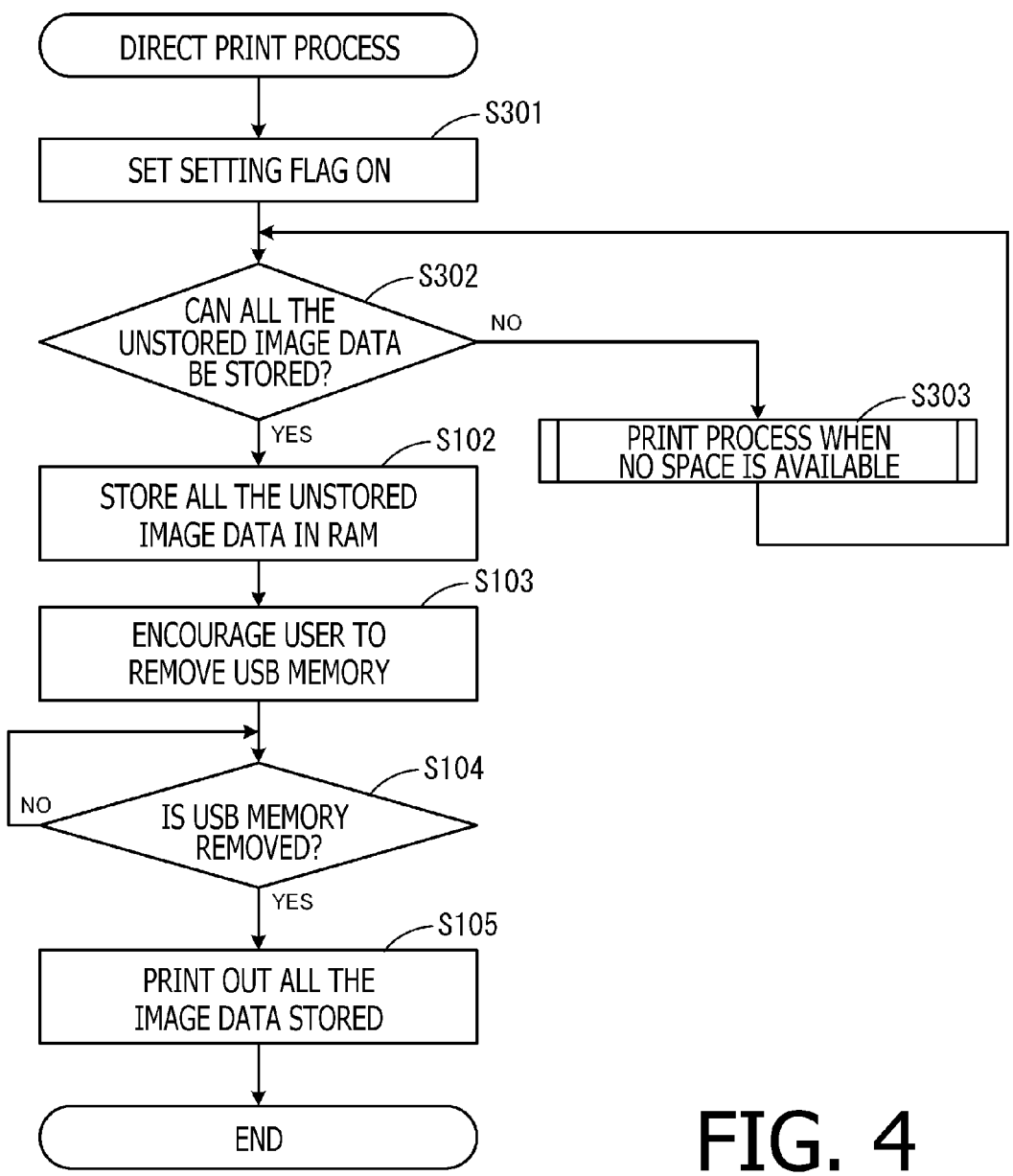
FIG. 4 is a flowchart illustrating a direct print process according to a second illustrative embodiment.

Referring to FIG. 4, a direct print process according to a second illustrative embodiment will be described.

In S301, the CPU 11A sets a set flag, which represents whether a process encouraging the user to set the set number is to be executed, to ON. When the set flag is set to ON, in a print process (see FIG. 5) when the RAM 11C does not have a sufficient free space according to the second illustrative embodiment, a process encouraging the user to set the set number is executed (S402), which will be described in detail later. The set flag is thereafter set to OFF (S404), and thus, the set number is set once in one execution of the direct print process.

In S302, the CPU 11A determines whether the RAM 11C has a sufficient free space for storing all the unstored image data. When there is a sufficient free space (S302: YES), the CPU 11A proceeds to S102, while there is not a sufficient free space (S302: NO), the CPU 11A proceeds to S303.

Steps S102-S105 are the same as those in the first illustrative embodiment. Accordingly, the same step numbers are assigned and description thereof is omitted for brevity. In S303, the CPU 11A executes the print process when the RAM 11C does not have a sufficient free space for storing all the unstored image data according to the second illustrative embodiment.

Print Process when RAM does not Have Sufficient Free Space

Figure 5:
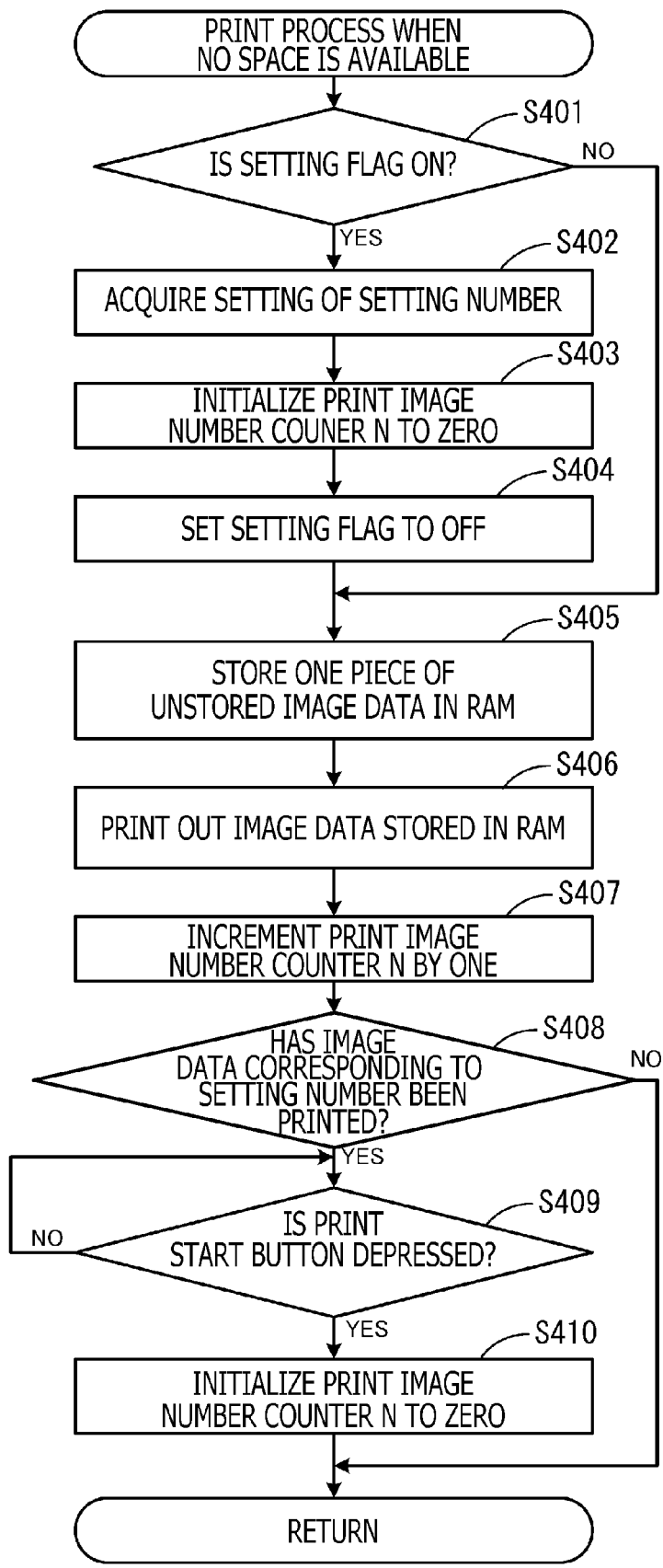
FIG. 5 is a flowchart illustrating a print process when there is not a sufficient space of the storage device according to the second illustrative embodiment.

Next, referring to FIG. 5, the print process when the RAM 11C does not have a sufficient free space for storing all the unstored image data.

In S401, the CPU 11A determines whether the set flag is ON or OFF. When the set flag is ON (S401: YES), the CPU 11A proceeds to S402, while when the set flag is OFF (S401: NO), the CPU 11A proceeds to S405, skipping S402-S404.

In S402, the CPU 11A causes the display unit 12 to display a screen encouraging the user to set the set number and acquires a user input.

In S403, the CPU 11A initializes a print image number counter N, which is a variable used to count the number of the printed images, to zero. In S404, the CPU 11A sets the set flag to OFF. In S405, the CPU 11A retrieves one piece of the unstored image data from the USB memory 20 and stores the same in the RAM 11C.

In S406, the CPU 11A causes the printing unit 14 to print out the image data stored in the RAM 11C in S405. Then, in S407, the CPU 11A increments the print number counter by one.

In S408, the CPU 11A determines whether the set number of image data has been printed. Specifically, the CPU 11A determines whether the print image number counter N has reached the set number, and determines that the set number of image data has been printed if the print image number counter N has reached the set number, while if the print image number counter N has not reached the set number, the CPU 11A determines that the set number of image data has not been printed. When the CPU 11A determines that the set number of image data has been printed (S408: YES), the CPU 11A proceeds to S409, otherwise (S408: NO), the CPU 11A terminates the present process and returns to the direct print process.

In S409, the CPU 11A determines whether the print start button has depressed. When the print start button has been depressed (S409: YES), the CPU 11A proceeds to 5410. When the print start button has not yet been depressed (S409: NO), the CPU 11A repeats 5409 until the print start button is depressed. That is, the CPU 11A interrupts the printing operation until the print start button is depressed. In S410, the CPU 11A initializes the print image number counter N to zero.

According to the second illustrative embodiment, if the set number is determined such that the printing operation is interrupted before the user leaves the printer 1, a possibility that the user stays at the printer 1 until it is determined that the RAM 11C has a sufficient free space in S302 becomes higher. If the user stays at the printer until it is determined that the RAM 11C has a sufficient free space, it is also possible that the user further stays at the printer 1 until the image data subject to print and has not been printed out will be printed. With this configuration, it becomes easier for the user to notice that the printing operation has not been completed, and thus, it is prevented that the USB memory 20 is remained unremoved.

Further, according to the second illustrative embodiment, the user can set the set number. Therefore, if a predetermined number is set as the set number in advance, a user may think troublesome since the number of times the user is required to depress the start button is increased if the set number is small. In such a case, the user may wish to change the set number by himself/herself. According to the second illustrative embodiment, the user is allowed to change the set number, which improves the operability of the printer 1.

It is noted that the above-described illustrative embodiments are only exemplary illustrative embodiments and configurations thereof can be modified in various ways as follows.

In the illustrative embodiments, when the RAM 11C does not have a sufficient free space for storing all the unstored image data (S101: NO), the image data retrieved from the USB memory 20 in S202 is printed out in S203. When the printer 1 has a function of printing the image data transmitted from an external device such as a personal computer, the printer 1 may be configured to print the image data which is transmitted from the personal computer or the like and stored in the RAM 11C. Further, when the printer 1 has a copier function, the image data which is stored by scanning the original with a copying function and stored in the RAM 11C may be printed out in S203.

In the first illustrative embodiment, when it is determined that the RAM 11C has a sufficient free space for storing all the unstored image data (S204: YES), the printing operation is terminated after printing all the image data stored in the RAM 11C except that the lastly printed piece of the image data (S208), and the image data to be printed lastly is printed after the USB memory 20 is removed from the printer 1. This configuration can be modified such that, when the RAM 11C has a sufficient free space (S204: YES), printing operation is not started until the USB memory 20 is removed from the printer 1, and the printing operation of all the image data is started after the USB memory 20 is removed from the printer 1.

There is a possibility that the user leaves the printer 1 before the printing operation of all the image data subject to print is completed. In such a case, the user may not notice that at least part of image data is not printed out. Therefore, it is preferable to have the user notice that at least part image data may not be printed out at an earlier stage.

If the printer 1 is configured such that the printing out of the image data is started on condition that the USB memory 20 is removed from the printer when it is determined that the RAM 11C has a sufficient free space for storing all the unstored image data, the printing operation does not start until the user removes the USB memory 20. With such a configuration, in comparison with a case where the printing operation interrupted after once started, it is possible to have the user notice that at least part of the image data is not printed. With this configuration, it is prevented that the USB memory 20 remains unremoved.

According to the first illustrative embodiment, when it is determined that the RAM 11C has a sufficient free space for storing all the unstored image data (S204: YES), the printing operation interrupted when all the stored image data except for the last piece of image data is printed, and that last piece of the image data is printed after the USB memory 20 is removed from the printer 1. It is noted that a timing when the printing operation is interrupted can be changed to any arbitrary timing if it is before completion of the printing of the last piece of the image data.

If the last piece of the image data includes a plurality of images, the printing operation may be interrupted after all the images included in the last piece of the image data except for an image to be printed lastly are printed, and the image to be lastly printed is printed after the USB memory 20 is removed from the printer 1.

According to the first illustrative embodiment, when it is determined that the RAM 11C has a sufficient free space for storing all the unstored image data (S101: YES), the all the image data stored in the RAM 11C in S102 is not printed until the USB memory 20 is removed from the printer 1, and the printing operation is started on condition that the USB memory 20 is removed from the printer 1.

The configuration may be modified such that, when it is determined that the RAM 11C has a sufficient free space (S101: YES), the printing operation is interrupted after all the image data stored in the RAM 11C in S102 except for the last piece of the image is printed, and the last piece of the image data is printed after the USB memory 20 is removed from the printer 1. The second illustrative embodiment 2 may be modified in a similar manner when it is determined that the RAM 11C has a sufficient free space for storing all the unstored image data (S302: YES).

In the first illustrative embodiment, a message such as "printing is executed with the USB memory being coupled to the printer" is displayed on the display unit 12, and a piece of image data is retrieved from the USB memory 20 and printed out the same (S202-S204). This configuration may be modified such that the user is allowed to select whether the printing operation is to be executed with the USB memory 20 being coupled to the printer in S201.

In the above modified configuration, for example, a message such as "do you want to continue printing with the USB memory being coupled to the printer?" is displayed on the display unit 12. When the user selects to execute the printing operation, the process may proceed to S202, while the user selects not to print, the process may be terminated. In the latter case, no image data will be printed out.

There may be a user who thinks that the image data will not be printed until the USB memory 20 is removed from the printer 1. Such a user may be confused if the image data is printed out with the USB memory 20 remains coupled to the printer 1. If the printer 1 is configured such that user can select whether the printing is to be executed with the USB memory 20 being coupled to the printer 1, such a confusion of the user can be suppressed.

In the illustrative embodiment, if the sum of the sizes of the unstored image data is equal to or less than the free space of the RAM 11C, it is determined that the RAM 11C has a sufficient free space for storing all the unstored image data. If the sum of the sizes of the unstored image data is greater than the free space of the RAM 11C, it is determined that the RAM 11C does not have a sufficient space for storing all the unstored image data. The above configuration may be modified such that the unstored image data is transferred piece by piece to the RAM 11C, and it is determined that the RAM 11C has a sufficient free space if the all the pieces of the unstored image data are stored in the RAM 11C, while it is determined that the RAM 11C does not have a sufficient free space if all the pieces of unstored image data cannot be stored in the RAM 11C.

According to the second illustrative embodiment, the user sets the set number. This may be modified such that the set number is a predetermined fixed number.

According to the illustrative embodiments, the USB memory 20 or the USB hard disk are described as example of the USB mass storage device. It is noted that the USB mass storage device may include a digital camera connected with the printer using a USB cable.

In the illustrative embodiments, as external recoding medium, the USB mass storage device are used. It is noted that the external storage medium need not be limited to the USB mass storage device. For example, the printer 1 may be provided with an NFC (near field communication) unit 16 which executes an NFC and obtain the data from a mobile information terminal 21 such as a smartphone, a tablet terminal and the like, through the NFC. Then, the printer 1 may prints out all the image data stored in the RAM 11C on condition that the wireless communication using the NFC between the printer 1 and the mobile information terminal 21 is changed from a communicatable state to non-communicatable state.

Figure 6:
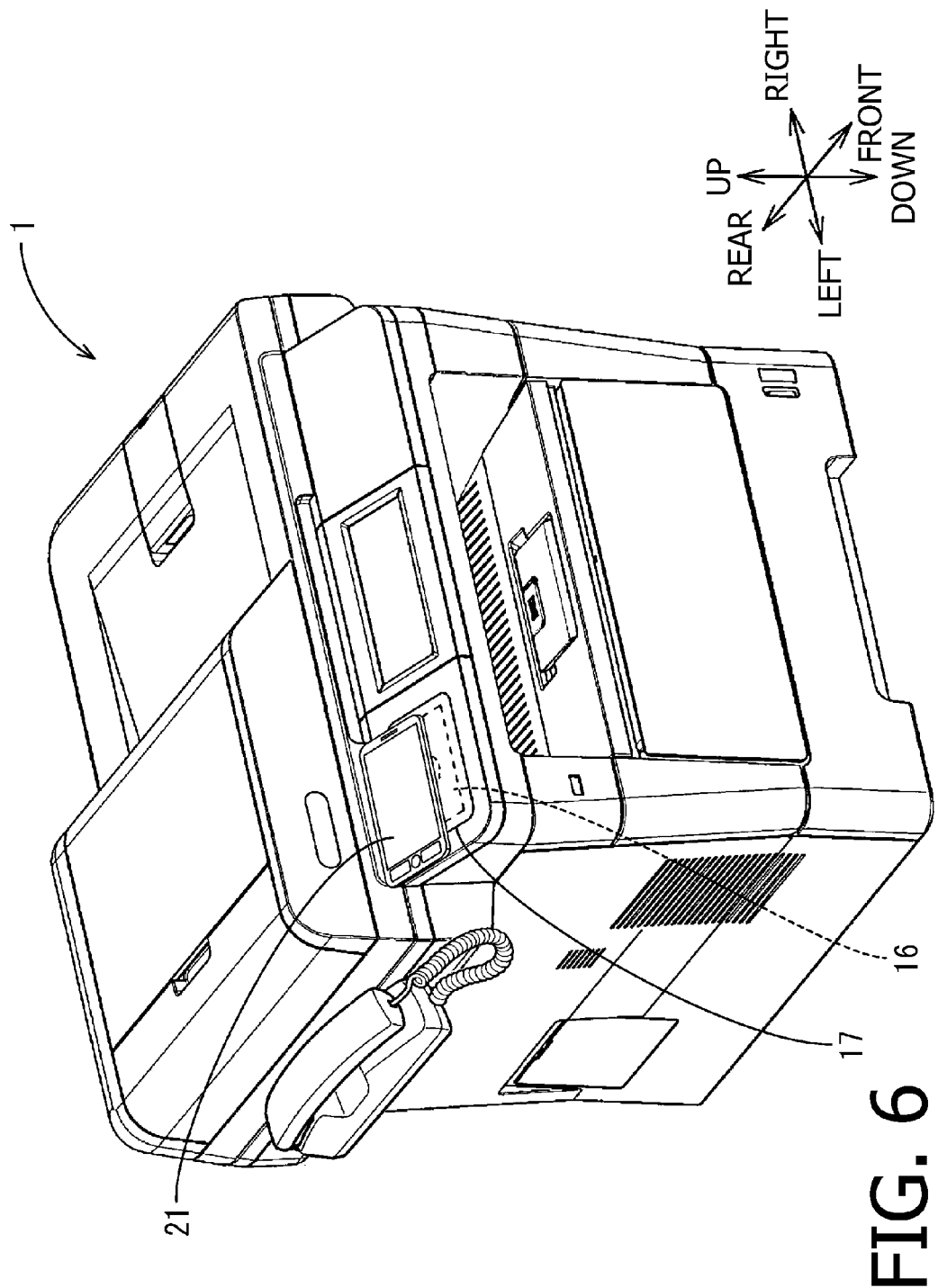
FIG. 6 is a perspective view of a print according to another illustrative embodiment.

In the printer 1 shown in FIG. 6 is provided with a plate-like holding unit 17 for holding the mobile information terminal 21, and below the holding unit 17, an NFC unit 16 is provided, which is indicated by dotted lines. When the image data stored in the mobile information terminal 21 is printed by the printer 1, the user can put the mobile information terminal 21 on the holding unit 17 and release his/her hand therefrom. Therefore, there is a possibility that the user leaves the mobile information terminal on the holding unit 17 when he/she moves away from the printer 1. If it is configured that printing of the image data is started on condition that the NFC between the mobile information terminal and the printer 1 is changed from the communicatable state to the non-communicatable state, it is prevented that the mobile information terminal is left on the holding unit 17.

Further, the printer 1 may be provided with an infrared communication unit and configured to receive data using infrared light. For example, the mobile information terminal and the printer 1 can communicate with each other with placing the mobile information terminal on a floor or a table close to the printer 1, the user can release his/her hands when the printing operation is executed. Therefore, there is a possibility that the user leaves the mobile information terminal on the floor or the table when he/she moves away from the printer 1. If it is configured that printing of the image data is started on condition that the infrared communication between the mobile information terminal and the printer 1 is changed from the communicatable state to the non-communicatable state, it is prevented that the mobile information terminal is left on the floor or the table.

Figure 7:
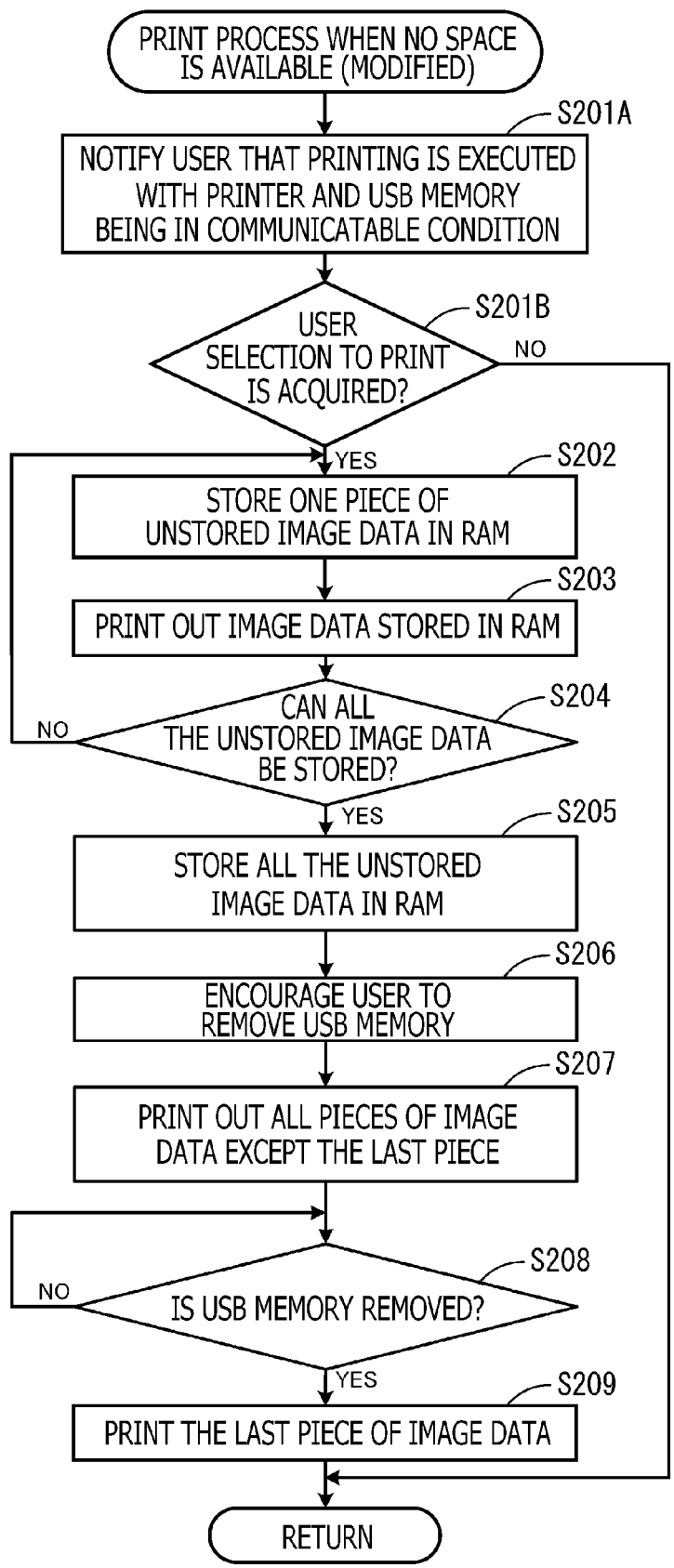
FIG. 7 is a flowchart illustrating a modified print process when there is not sufficient space in the storage device according to the first illustrative embodiment.

FIG. 7 is a flowchart illustrating a modified print process when no space is available. It is noted that FIG. 7 is similar to FIG. 3 except that S201 of FIG. 3 is replaced with S201A and S201B. According to this modification, in S201A, the CPU 11A causes the displaying unit 12 to display a message (e.g., "printing will be executed with the printer and the USB memory being in a communicatable condition"). Then, in S201B, the CPU 11A acquires the user's selection to proceed to execute printing (S201B: YES). Thereafter, steps S202-S209, which are similar to those in FIG. 2, will be executed. If the user does not wish to proceed to execute printing (5201B: NO), the CPU 11A terminates the process shown in FIG. 7. It is noted that the process shown in FIG. 7 may be further modified such that step S201B is omitted. In such a case, as in FIG. 2, the printing is executed after the notification in S201A is made, without acquiring the user selection.

In the illustrative embodiments, the RAM 11C is used as the storage device. This configuration may be modified such that a communication interface unit for connecting with a communication network such as a LAN (local area network) is provided to the printer 1, and an external computer such as a file server connectable through the network may be used as the storage device.

According to the illustrative embodiment, the image data to be printed out is the image data selected by the user. The configuration may be modified such that all the image data stored in the external storage device may be subject to print.

In the illustrative embodiment, the printer 1 is described as the data output device. It is noted that the data output device need not be limited to a printer. For example, the data output device may be a device provided with a communication interface unit and configured to transmit data obtained from the external storage medium to the external computer such as a file server.

According to the illustrative embodiments, each process is executed by the CPU 11A. At least part of such processes may be executed by the ASIC 11D. Alternatively, the control unit 11 may not be provided with the ASIC 11D. Further alternatively, the control unit 11 may be provided with a plurality of CPUs, and the processes described above may be shared by the plurality of CPUs.

What is claimed is:

1. A data output device, comprising:
a wired interface or a wireless interface configured to communicate with an external storage device storing subject data which is data subject to output;
an outputting unit;
an internal storage device; and
a processor comprising hardware configured to cause, when executing instructions, the data output device to execute a determining process to determine whether the internal storage device has a free space in which all unstored subject data, which is the subject data stored in the external storage device and has not been stored in the internal storage device, can be stored,
wherein, when the processor comprising hardware determines that the internal storage device does not have the free space in which all the unstored subject data can be stored, the processor comprising hardware causes the data output device to repeatedly execute following processes (a)-(c):
(a) a first storing process to store predetermined part of the unstored subject data into the internal storage device;
(b) a first output process to output, with use of the outputting unit, the subject data having been stored in the internal storage device, an area of the internal storage device occupied by the subject data output by the first output process being released when the subject data is output; and
(c) the determining process to determine whether the internal storage device has the free space in which all the unstored subject data can be stored,
wherein, when the processor comprising hardware determines that the internal storage device has the free space in which all the unstored subject data can be stored, the processor comprising hardware causes the data output device to execute following processes (d)-(f):
(d) a second storing process to store all the unstored subject data into the internal storage device;
(e) a condition determining process to detect a communication condition between the wired interface or the wireless interface and the external storage device; and
(f) a second output process to output, with use of the outputting unit, all the subject data having been stored in the internal storage device, the subject data to be output lastly being output only when the processor comprising hardware detects that the communication condition between the wired interface or the wireless interface and the external storage device has been changed to a non-communicable condition.

2. The data output device according to claim 1, further comprising a surface configured to hold the external storage device,
wherein the processor comprising hardware detects that the wireless interface and the external storage device are in a communicable condition when the external storage device is held by the surface, while the processor comprising hardware detects that the wireless interface and the external storage device are in the non-communicable condition when the external storage device is not held by the surface.

3. The data output device according to claim 2,
wherein the surface is configured such that the external storage device is detachably coupled to the surface, and
wherein the processor comprising hardware detects that the wireless interface and the external storage device are in the communicable condition when the external storage device is coupled to the surface, while the processor comprising hardware detects that the wireless interface and the external storage device are in the non-communicable condition when the external storage device is detached from the surface.

4. The data output device according to claim 1,
wherein the subject data includes print data, and
the outputting unit includes a printing unit configured to print out the print data.

5. The data output device according to claim 1,
wherein the processor comprising hardware starts outputting the subject data when the processor comprising hardware detects that the communication condition between the wired interface or the wireless interface and the external storage device has been changed to the non-communicable condition.

6. The data output device according to claim 1,
wherein the processor comprising hardware detects the communication condition between the wired interface or the wireless interface and the external storage device at a predetermined timing during the second output process and before completion of outputting of all the subject data,
wherein the processor comprising hardware executes:
a interruption process to interrupt outputting of the subject data during the second output process when the processor comprising hardware detects that the communication condition between the wired interface or the wireless interface and the external storage device is a communicable condition at the predetermined timing; and
a resuming process to resume the second output process interrupted by the interruption process to output the subject data which has not been output when the processor comprising hardware detects that the communication condition between the wired interface or the wireless interface and the external storage device has been changed to the non-communicable condition.

7. The data output device according to claim 1,
further comprising a display,
wherein the processor comprising hardware is configured to execute a first notification process to cause the display to provide a notification encouraging a user to make the communication condition between the wired interface or the wireless interface and the external storage device be the non-communicable condition when the processor comprising hardware determines that the internal storage device has the free space in which all the unstored subject data cannot be stored.

8. The data output device according to claim 1,
further comprising an operation unit,
wherein the processor comprising hardware executes:
a interruption process to interrupt outputting of the subject data, during the first output process, every time when the outputting unit outputs the subject data by a predetermined amount;
an instruction receiving process to receive a user instruction to resume the first output process through the operation unit; and
a resuming process to resume the first output process to output the subject data which has not been output.

9. The data output device according to claim 8,
wherein the processor comprising hardware executes an amount receiving process to receive a user input of the predetermined amount through the operation unit.

10. The data output device according to claim 1,
wherein, when the processor comprising hardware determines that the internal storage device does not have the free space in which all the unstored subject data can be stored, the processor comprising hardware executes a notification process to notify, with use of a display, a user that the subject data is output although the wired interface or the wireless interface and the external storage device are in a communicable condition.

11. The data output device according to claim 1,
wherein, when the processor comprising hardware determines that the internal storage device does not have the free space in which all the unstored subject data can be stored, the processor comprising hardware executes a selection acquiring process to acquire a user selection, before the outputting unit outputs the subject data, whether the subject data is to be output with the wired interface or the wireless interface and the external storage device being in a communicable condition in order to output the unstored subject data, and
wherein the processor comprising hardware causes the outputting unit to output the subject data stored in the internal storage device when the processor comprising hardware acquires the user selection to output the subject data with the wired interface or the wireless interface and the external storage device being in the communicable condition.

12. A data output device, comprising:
a wired interface or a wireless interface configured to communicate with an external storage device storing subject data which is data subject to output;
an outputting unit;
an internal storage device; and
a processor comprising hardware configured to cause, when executing instructions, the data output device to execute a determining process to determine whether the internal storage device has a free space in which all unstored subject data, which is the subject data stored in the external storage device and has not been stored in the internal storage device, can be stored,
wherein, when the processor comprising hardware determines that the internal storage device has the free space in which all the unstored subject data can be stored, the processor comprising hardware causes the data output device to execute following processes:
a storing process to store all the unstored subject data into the internal storage device;
a condition determining process to detect a communication condition between the wired interface or the wireless interface and the external storage device; and
an output process to output, with use of the outputting unit, all the subject data having been stored in the internal storage device, at least part of the subject data to be output lastly being output only when the processor comprising hardware detects that the communication condition between the wired interface or the wireless interface and the external storage device has been changed to a non-communicable condition.

* * * * *